(12) United States Patent
Kliemannel

(10) Patent No.: US 6,827,195 B2
(45) Date of Patent: Dec. 7, 2004

(54) LOCKING AND UNLOCKING MECHANISM COMPRISING A SOLENOID

(75) Inventor: Wolfgang Kliemannel, Lemförde (DE)

(73) Assignee: ZF Lemförder Metallwaren AG, Stemwede-Dielingen (DE)

(*) Notice: Subject to any disclaimer, the term of this patent is extended or adjusted under 35 U.S.C. 154(b) by 0 days.

(21) Appl. No.: 10/343,092

(22) PCT Filed: Jun. 19, 2002

(86) PCT No.: PCT/DE02/02221
§ 371 (c)(1),
(2), (4) Date: Jan. 23, 2003

(87) PCT Pub. No.: WO03/002895
PCT Pub. Date: Jan. 9, 2003

(65) Prior Publication Data
US 2004/0031660 A1 Feb. 19, 2004

(30) Foreign Application Priority Data
Jun. 26, 2001 (DE) .......................... 101 30 335

(51) Int. Cl.$^7$ ............................ B60K 41/26; G05G 5/18
(52) U.S. Cl. ............................ 192/220.4; 74/473.24; 74/532; 192/220.2; 361/160
(58) Field of Search .......................... 192/220.2, 220.3, 192/220.4, 220.5, 220.6, 220.7; 477/96; 74/473.21, 473.23, 473.24, 529, 532; 361/154, 152, 160

(56) References Cited

U.S. PATENT DOCUMENTS

| 4,898,361 A | * 2/1990 | Bender et al. ............... 361/154 |
| 5,445,575 A | 8/1995 | Sundeen |
| 6,059,687 A | 5/2000 | Durieux et al. |
| 6,297,941 B1 | * 10/2001 | Hoffmann et al. .......... 361/160 |
| 6,560,088 B1 | 5/2003 | Beck et al. |
| 6,671,158 B1 | * 12/2003 | Underwood ............... 361/153 |

FOREIGN PATENT DOCUMENTS

| DE | 43 40 769 | 6/1995 |
| DE | 196 41 188 | 1/1998 |
| DE | 197 52 752 | 6/1999 |
| DE | 198 25 479 | 12/1999 |
| DE | 198 60 272 | 7/2000 |
| EP | 0 655 835 | 5/1995 |

* cited by examiner

Primary Examiner—Rodney H. Bonck
(74) Attorney, Agent, or Firm—McGlew and Tuttle, P.C.

(57) ABSTRACT

The present invention pertains to a locking and unlocking mechanism, which is equipped with an electromagnet (1) and is used preferably to embody a key and/or shift lock function in motor vehicles. Its basic object is to design such a mechanism such that the generation of noise during the transition from one state into the other is reduced compared with prior-art solutions. To accomplish the object, a pulsating voltage in the form of a direct voltage-rated pulse width signal (PWM voltage) is sent to the electromagnet (1). The effective value of the PWM voltage is increased over at least three voltage pulses from an off-load voltage value to a preset final voltage value at the beginning of a phase of energization and it conversely drops, again over at least three voltage pulses, to the off-load voltage value at the end of the phase of energization, in a time-controlled manner by means of a circuit unit (2) associated with a pulse width modulator (3).

16 Claims, 2 Drawing Sheets

LOCKING AND UNLOCKING MECHANISM COMPRISING A SOLENOID

FIELD OF THE INVENTION

The present invention pertains to a locking and unlocking mechanism with an electromagnet, which mechanism is used preferably to assume a key and/or shift lock function in motor vehicles.

BACKGROUND OF THE INVENTION

Mechanisms that block or release certain mechanical elements for manual actuation by a user as a function of preset states are needed for a very great variety of purposes. A typical application of such mechanisms is the key and/or shift lock function in a motor vehicle with automatic shifting. The purpose of the locking and unlocking mechanism is to make possible the actuation of the selector lever, especially the shifting from the "Park" position into the reverse position or into the "Drive" position, e.g., only if the ignition key is in a certain position in the ignition lock or when the brake [pedal] is depressed. Such locking and unlocking mechanisms are embodied with the use of an electromagnet, which is energized depending on the desired behavior (locking or unlocking) in corresponding positions of the ignition key and/or state of actuation of the brake pedal.

One example of such a locking mechanism is known from DE 198 25 479 A1. The mechanism comprises essentially a check plate, which is pivotable with the selector lever, an electromagnet fastened to the selector lever housing, and a permanent magnet arranged on the check plate. A blocking pin, which engages openings of the gear shift gate, is blocked or released for moving it out of the said openings by means of the check plate via an unlocking tongue.

In the device described in the document, the electromagnet is attracted by the permanent magnet in the non-energized state and the permanent magnet is held as a result at the electromagnet together with the check plate. As a result, the blocking pin is blocked against being moved out of an opening of the gear shifting gate by means of an unlocking tongue of the check plate. It e.g., the electromagnet at the selector lever housing is energized, e.g., by actuating the brake pedal, a magnetic field is built up, by which the permanent magnet that is in contact with it is repelled together with the check plate and the blocking pin is released by the unlocking tongue of the check plate.

The shift lever can be brought from the "Park" position into the "Drive" position only by a corresponding actuation by the user. The attraction and repelling of the permanent magnet by the electromagnet is associated with an undesired noise generation. The noise level additionally depends on the actual onboard voltage present, which is usually between 9V and 16V. A possibility of eliminating at least the effects of possible fluctuations in the onboard voltage and minimizing the noise level at the same time is to send a direct voltage-rated pulse width signal to the electromagnet. In case of energization of the electromagnet, a pulsating voltage (PWM voltage; PWM =English Pulse Width Modulation) with constant effective value, preferably 9 V, is sent to the electromagnet.

Any fluctuations in the voltage of the onboard system are converted by the pulse width modulation providing the PWM voltage only in the form of changed pulse widths of the pulse width signal sent to the electromagnet. Despite the noise reduction resulting herefrom, the noise which continues to occur during locking and unlocking, which is caused by the impact of the electromagnet with metallic parts or a permanent magnet, is sometimes still felt to be disturbing.

SUMMARY OF THE INVENTION

The object of the present invention is to design a locking and unlocking mechanism, by which the noise generation during the transition from one state into the other is reduced, so that any noise is practically not perceived any longer.

The object is accomplished with a locking and unlocking mechanism having the features of the principal claim. Advantageous embodiments or variants of the present invention are described in the subclaims. The locking and unlocking mechanism, which is preferably used to embody a key and/or shift lock function in a motor vehicle, is based in the known manner on the act that mechanical elements are blocked or released for manual actuation depending on the preset states, and this is achieved by energizing an electromagnet. Metallic parts are attracted and held or at least a permanent magnet is repelled during the energization of the electromagnet by the magnetic field built up as a result. To energize the electromagnet, a pulsating electric voltage is used as a direct voltage-rated pulse width signal (PWM voltage). However, the effective value of the PWM voltage, time-controlled by a circuit unit associated with the pulse width modulator, is increased according to the present invention at the beginning of a phase of energization over at least three voltage pulses from an off-load voltage value to a preset final voltage value. Conversely, the effective value of the PWM voltage again drops at the end of the phase of energization over at least three voltage pulses to a resting voltage value that is no longer sufficient for attracting metallic parts or for repelling the permanent magnet or the permanent magnets.

The three voltage pulses during the rise in the effective value also comprise the last offload voltage pulse before the rise in the effective value and the first final voltage pulse after this last off-load voltage pulse. Furthermore, the three voltage pulses during the drop of the effective value comprise the last final voltage pulse before the drop of the effective value and the first offload voltage pulse after this last final voltage pulse.

The rise and drop of the effective value of the PWM voltage takes place with at least three different voltage values, and the effective value is controlled by varying the pulse-width repetition rate of the PWM voltage by means of the circuit unit. The off-load voltage value and the final voltage value are also counted as voltage values during the rise or drop of the effective value, so that at least one voltage value of the different voltage values is located between the off-load voltage value and the final voltage value.

The effective value, which forms a square mean value, always applies here only to the particular period to be considered, and the duration of a period is obtained from the time period between the beginning of a pulse and the beginning of the next pulse. If the pulse width repetition rate changes from one period to the next, the effective value changes as a function of the pulse width repetition rate as well.

At the beginning of the rise, the amount of the change in the effective value between two consecutive pulses is preferably greater than near the end of the voltage rise. Furthermore, the amount of the change in the effective value between two consecutive pulses is greater at the beginning of the voltage drop than near the end of the voltage drop.

A locking and unlocking mechanism designed in this manner can be used, of course, not only in connection with the embodiment of the key and/or shift lock function in a motor vehicle. The principle of the present invention can rather be readily applied to a plurality of applications. Thus, the description, which is related below primarily to the application in a motor vehicle, does not represent any limitation of the subject of the present invention.

Corresponding to a practical design of the locking and unlocking mechanism, the effective value of the PWM voltage rises exponentially degressively at the beginning of the phase of energization of the electromagnet, whereas it drops exponentially degressively at the end of the phase of energization. The time constant for reaching the preset effective voltage during energization and for reaching the off-load voltage during an interruption of the energization can be set in the circuit unit directly associated with the pulse width modulator. This circuit unit may be a timer or, in a possible embodiment of the present invention, an RC network, whose time constant determines the delay in the rise or drop of the effective value of the PWM voltage. However, the change in the effective value of the PWM voltage over time may also be controlled by means of a software run on a microcontroller, even if the microcontroller also has other tasks in a more complex system.

In one embodiment, the locking and unlocking mechanism according to the present invention is used to embody a shift lock function to block and release the actuation of the selector lever of an automatic transmission in a motor vehicle. According to a possible valiant, the blocking of the selector lever is brought about by the magnetic holding of a check plate with a permanent magnet fastened thereto by means of an electromagnet arranged at the selector lever housing. By holding the check plate, a blocking pin connected to the gearshift lever is prevented from moving out of an opening or locked position of the gear shifting gate. The selector lever is consequently blocked when the electromagnet is not energized and is attracted by the permanent magnet. Another possibility is for a detent engaging an opening of a blocking element in the form of a cable lever that is in functional connection with the selector lever when the electromagnet is energized, whereas the detent releases the cable lever and consequently the selector lever in the non-energized state of the electromagnet.

The effective value of the PWM voltage is preferably 9 V during the energization of the electromagnet in the embodiment that is suitable for use as a shift lock mechanism in a motor vehicle. The off-load voltage is 0 V, so that the electromagnet is not energized at the off-load voltage at all. According to the basic principle of the present invention, the effective value of the voltage present during the phase of energization on the electromagnet is gradually increased to the final value of 9 V with the beginning of the energization. In light of the exponentially degressive rise in the effective value of the voltage, which is provided according to a preferred embodiment, the voltage value rises at first rapidly to a voltage value that does not yet make possible the transition into the respective other state (from "release" to "block or from "block" to release," depending on the mechanical embodiment of the parts moved by means of the electromagnet). By contrast, there still is only a comparatively slow rise in the effective value in the range in which the effective voltage becomes effective in light of the fact that the other state preset during the energization of the electromagnet is assumed. As a result, the attraction of a metallic element or the repelling of a permanent magnet by the electromagnet slows down in such a way that an audible impact of elements of the locking mechanism nearly fails to occur. The noise level is at least reduced markedly compared with the prior-art solutions.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
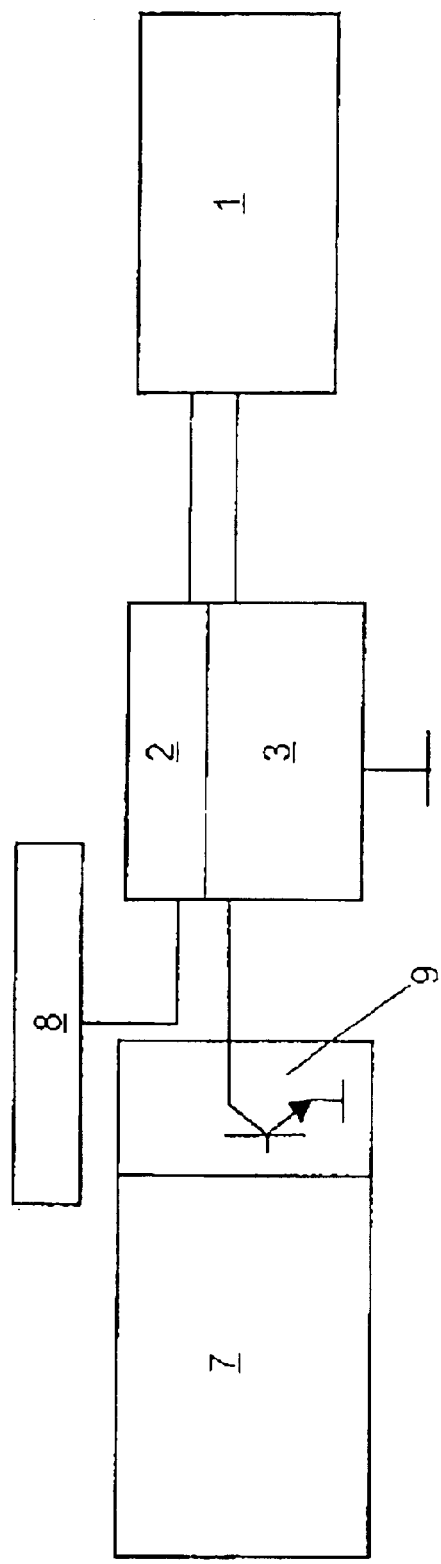
FIG. 1 is a block diagram for the actuation of a key or shift lock magnet in a motor vehicle.

Referring to the drawings in particular, FIG. 1 illustrates the present invention in the form of a block diagram, which pertains to the actuation of the electromagnet 1 of the locking and unlocking mechanism, once again based on the example of its use in a motor vehicle. The actuation of the shift lock magnet (electromagnet 1) is brought about by circuit units 7 on the vehicle, such as a transmission control device and the like, as a function of preset states. The corresponding control signal is sent for this purpose to a pulse width modulator 3. According to the basic idea of the present invention, a circuit unit 2 (in the form of a timer or an RC network), by which the pulse width repetition rate and consequently also the effective value of the PWM voltage sent by the pulse width modulator 3 is increased over at least three voltage pulses to the maximum (preferably 9 V) in case of energization of the electromagnet 1, is associated with the pulse width modulator 3. At the end of the phase of energization, the same circuit brings about a reduction in the pulse-width repetition rate and consequently also a drop of the effective value of the PWM voltage over at least three voltage pulses to 0 V. The mechanical parts of the locking and unlocking mechanism move more slowly corresponding to the smaller change over time in the effective value of the PWM voltage. The clicking noise, which is caused, e.g., by the striking of a metallic part (or a permanent magnet at the time when the energization is switched off) attracted by the electromagnet, is thus extensively avoided. The energization of the shift lock magnet 1 takes place according to the schematic diagram shown via corresponding terminals 8 of the vehicle's electrical system, the pulse width modulator 3 (time)-controlled by the circuit unit 2 and a driver end stage 9 used for signal amplification. Depending on the design, the driver stage 9 may also be arranged upstream of the pulse width modulator 3.

Figure 2:
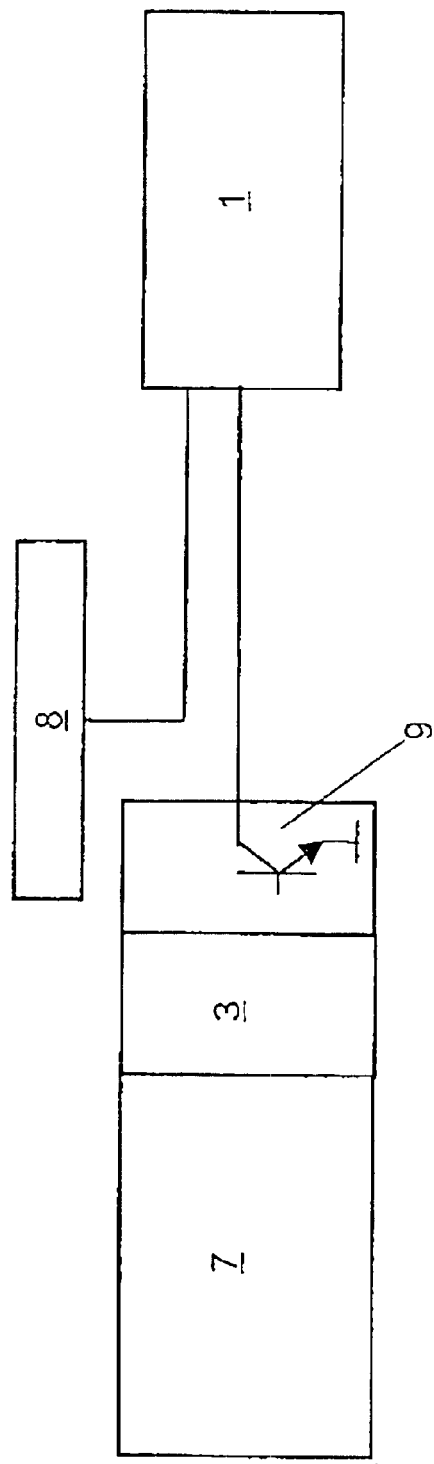
FIG. 2 is a circuit according to the state of the art, which is comparable to FIG. 1.

FIG. 2 shows a schematic diagram comparable to FIG. 1 for actuating the electromagnet 1 corresponding to an embodiment known from the state of the art. Even though the electromagnet 1 is actuated via a pulse width modulator 3 to prevent disadvantageous effects of voltage fluctuations occurring in the onboard power supply system, the corresponding effective value of the pulse width-modulated voltage is switched through to the electromagnet 1 directly abruptly with the onset of a corresponding state of the system (e.g., actuation of the brake pedal), unlike according to the present invention. Thus, the locking and unlocking mechanism assumes the respective other state abruptly.

Even though a certain reduction of the noise level is achieved by the use of a PWM voltage, noises of a comparatively high level, which are perceived as disturbing at least in the particular case, are still generated due to the abrupt switchover.

Figure 3B:
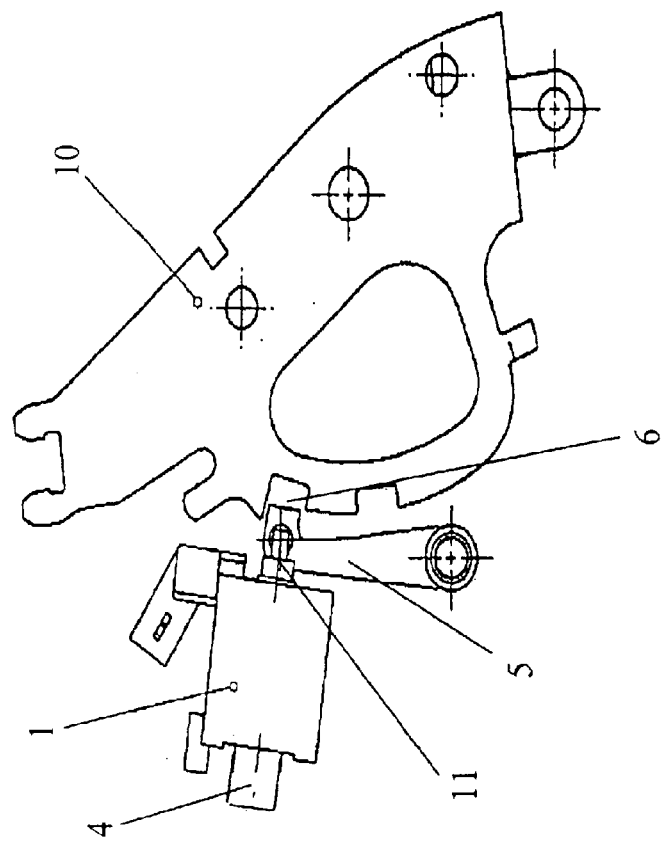
FIGS. 3a, 3b show the mechanical embodiment in connection with a shift lock function for the selector lever of an automatic transmission.
Figure 3A:
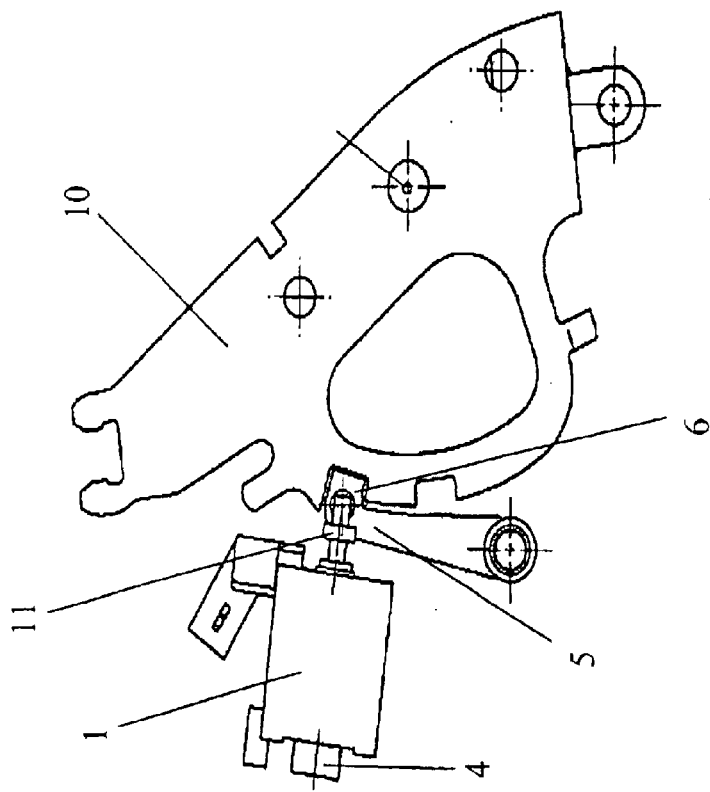

FIGS. 3a and 3b show the use of the locking and unlocking mechanism in connection with the blocking and release of the selector lever of an automatic transmission in the mechanical embodiment of the magnetic states determined by the particular actuation of the electromagnet 1. The electromagnet 1 actuates a locking element 5 in the form of a detent, which engages the opening 6 of a cable lever 10 that is in functional connection with the selector lever or moves out of the said opening depending on the state of energization of the electromagnet 1.

The cable lever 10 and consequently the gear selector lever are blocked in FIG. 3a as a consequence of the fact that the locking element 5 engages the opening 6. This state arises when the ignition is turned on and the brake pedal is not depressed. The energized electromagnet 1, designed as a hollow cylinder (coil), attracts a metallic part 4, namely, an iron core, so that the latter moves from left to right into the electromagnet against the force of a spring (not shown) arranged inside the electromagnet 1 and pushes out a plunger 11 connected thereto to the right. The detent-like locking element 5 is at the same time pushed by the plunger 11 into the opening 6 and the cable lever 10 is blocked hereby. If, e.g., the brake pedal is now actuated, the vehicle's control electronic system 7 shown in FIG. 1 will interrupt the energization of the electromagnet 1. However, this does not take place abruptly but, in the sense of the present invention, more slowly due to the circuit unit 2, in the form of a gradual drop of the effective value of the PWM voltage used to actuate the electromagnet 1 to the off-load value (0 V). As is apparent from FIG. 3b, the iron core 4 is again pushed by the resetting force of the above-mentioned spring somewhat to the left out of the electromagnet and the plunger 11 is thus withdrawn and the locking element 5 is moved out of the opening 6 of the cable lever 10. The gear selector lever, not shown, can now be moved by the driver out of the parked position into a drive position.

While specific embodiments of the invention have been shown and described in detail to illustrate the application of the principles of the invention, it will be understood that the invention may be embodied otherwise without departing from such principles.

What is claimed is:

1. A locking and unlocking mechanism for providing a key and/or shift lock function in a motor vehicle, by which mechanical elements are blocked or released for manual actuation as a function of preset states, the mechanism comprising:
   an electromagnet for actuating the blocking or the release upon energization of said electromagnet;
   metallic parts or a permanent magnet, the metallic parts being attracted and held or permanent magnet being repelled by the magnetic field built up during the energization of the electromagnet; and
   a circuit unit associated with a pulse width modulator providing a pulsating electric voltage sent as a direct voltage-rated pulse width sign (PWM voltage) to said electromagnet to energize said electromagnet wherein the effective value of the pulse width signal rises to a preset final voltage value over at least three voltage pulses from an off-load voltage value at the beginning of a phase of energization and drops to the off-load voltage value that is no longer sufficient to attract said metallic parts or to repel the permanent magnet over at least three voltage pulses at the end of a phase of energization in a time-controlled manner.

2. A locking and unlocking mechanism in accordance with claim 1, wherein the effective value of the PWM voltage rises exponentially progressively at the beginning of the phase of energization of the electromagnet and drops exponentially degressively at the end of the phase of energization, wherein the time constant for reaching the preset final voltage value or the off-load voltage value can be set with said circuit unit.

3. A locking and unlocking mechanism in accordance with claim 1, wherein said circuit unit is an RC network with a time constant determining the duration of the rise and the duration of the drop of the effective value of the PWM voltage.

4. A locking and unlocking mechanism in accordance with claim 1, wherein said circuit unit is a microcontroller, wherein the changes in the effective value of the PWM voltage over time are determined by a program run by the microcontroller.

5. A locking and unlocking mechanism in accordance with claim 1, with a shift lock function for blocking and releasing the actuation of the selector lever of an automatic transmission in a motor vehicle, in which the blocking or the release of the selector lever is carried out by a locking element which blocks the selector lever when said electromagnet is energized by engaging an opening or said locked position provided for this purpose.

6. A locking and unlocking mechanism in accordance with claim 5, wherein the effective value of the PWM voltage is increased to a final value of 9V at the beginning of the phase of energization and it drops to 0V at the end of the energization.

7. A locking and unlocking mechanism in accordance with claim 1, with a shift lock function for blocking and releasing the actuation of the selector lever of an automatic transmission in a motor vehicle, in which the blocking or the release of the selector lever is carried out by a locking element which is prevented from sliding out of an opening or said locked position provided for this purpose when said electromagnet is not energized.

8. A locking and unlocking mechanism in accordance with claim 7, wherein the effective value of the PWM voltage is increased to a final value of 9V at the beginning of the phase of energization and it drops to 0V at the end of the energization.

9. A locking and unlocking system comprising:
   mechanical elements which are blocked or released for manual actuation as a function of preset states;
   an electromagnet for actuating the blocking or the release upon energization of said electromagnet;
   metallic parts or a permanent magnet, the metallic parts being attracted and held or the permanent magnet being repelled by the magnetic field built up during the energization of the electromagnet;
   a circuit unit and associated pulse width modulator (PWM) providing a pulsating electric voltage sent as a direct voltage-rated pulse width modulated signal to the electromagnet to energize the electromagnet wherein the effective value of the pulse width modulated signal rises to a preset final voltage value over at least three voltage pulses from an off-load voltage value at the beginning of a phase of energization and drops to the off-load voltage value that is no longer sufficient to attract said metallic parts or to repel the permanent magnet over at least three voltage pulses at the end of a phase of energization in a time-controlled manner.

10. A locking and unlocking system in accordance with claim 9, wherein the effective value of the PWM voltage rises exponentially progressively at the beginning of the phase of energization of the electromagnet and drops exponentially degressively at the end of the phase of energization, wherein the time constant for reaching the preset final voltage value or the off-load voltage value can be set with said circuit unit.

11. A locking and unlocking system in accordance with claim 9, wherein said circuit unit is an RC network with a time constant determining the duration of the rise and the duration of the drop of the effective value of the PWM voltage.

12. A locking and unlocking system in accordance with claim 9, wherein said circuit unit is a microcontroller, wherein the changes in the effective value of the PWM voltage over time are determined by a program run by the microcontroller.

13. A locking and unlocking system in accordance with claim 9, with a shift lock function for blocking and releasing the actuation of the selector lever of an automatic transmission in a motor vehicle, in which the blocking or the release of the selector lever is carried out by a locking element which blocks the selector lever when said electromagnet is energized by engaging an opening or said locked position provided for this purpose.

14. A locking and unlocking system in accordance with claim 13, wherein the effective value of the PWM voltage is increased to a final value of 9V at the beginning of the phase of energization and it drops to 0V at the end of the energization.

15. A locking and unlocking system in accordance with claim 9, with a shift lock function for blocking and releasing the actuation of the selector lever of an automatic transmission in a motor vehicle, in which the blocking or the release of the selector lever is carried out by a locking element which is prevented from sliding out of an opening or said locked position provided for this purpose when said electromagnet is not energized.

16. A locking and undocking system in accordance with claim 15, wherein the effective value of the PWM voltage is increased to a final value of 9V at the beginning of the phase of energization and it drops to 0V at the end of the energization.

* * * * *